United States Patent [19]

Alet et al.

[11] Patent Number: 4,496,323
[45] Date of Patent: Jan. 29, 1985

[54] FORCE RESTORATION SYSTEM FOR THE SIMULATION OF VEHICLE DRIVING MEMBERS

[75] Inventors: Robert Alet; Eric Vignault, both of Cergy, France

[73] Assignee: Thomson-CSF, Paris, France

[21] Appl. No.: 560,974

[22] Filed: Dec. 13, 1983

[30] Foreign Application Priority Data

Dec. 14, 1982 [FR] France ................. 82 20966

[51] Int. Cl.$^3$ ............................... G09B 9/02
[52] U.S. Cl. ......................................... 434/29
[58] Field of Search ............. 434/29, 62, 66, 45, 434/258

[56] References Cited

U.S. PATENT DOCUMENTS

| | | | |
|---|---|---|---|
| 2,851,795 | 9/1958 | Sherman | 434/45 |
| 3,795,990 | 3/1974 | Quicker, Jr. | 434/66 |
| 3,861,065 | 1/1975 | Courtenay et al. | 434/45 |
| 3,973,332 | 8/1976 | Slomski | 434/258 |
| 4,227,319 | 10/1980 | Guy et al. | 434/45 |

FOREIGN PATENT DOCUMENTS 762826 12/1956 United Kingdom ............... 434/45

Primary Examiner—William H. Grieb
Attorney, Agent, or Firm—Cushman, Darby & Cushman

[57] ABSTRACT

A member placed in a vehicle driving simulator makes it possible to simulate the hydraulic braking and driving controls. It comprises a cylindrical envelope in which slide a first member and a piston joined by a tubular elastomer spring, whose compression simulates the deformation of the hydraulic pipes and the braking members. With the bottom of the envelope, the piston forms a back-pressure chamber which is supplied with compressed air and makes it possible to simulate the feedback of the braking system. A retractable stop at the bottom of the envelope and on which bears a rod extending the piston, makes it possible when it is retracted, to simulate a hydraulic circuit failure.

5 Claims, 5 Drawing Figures

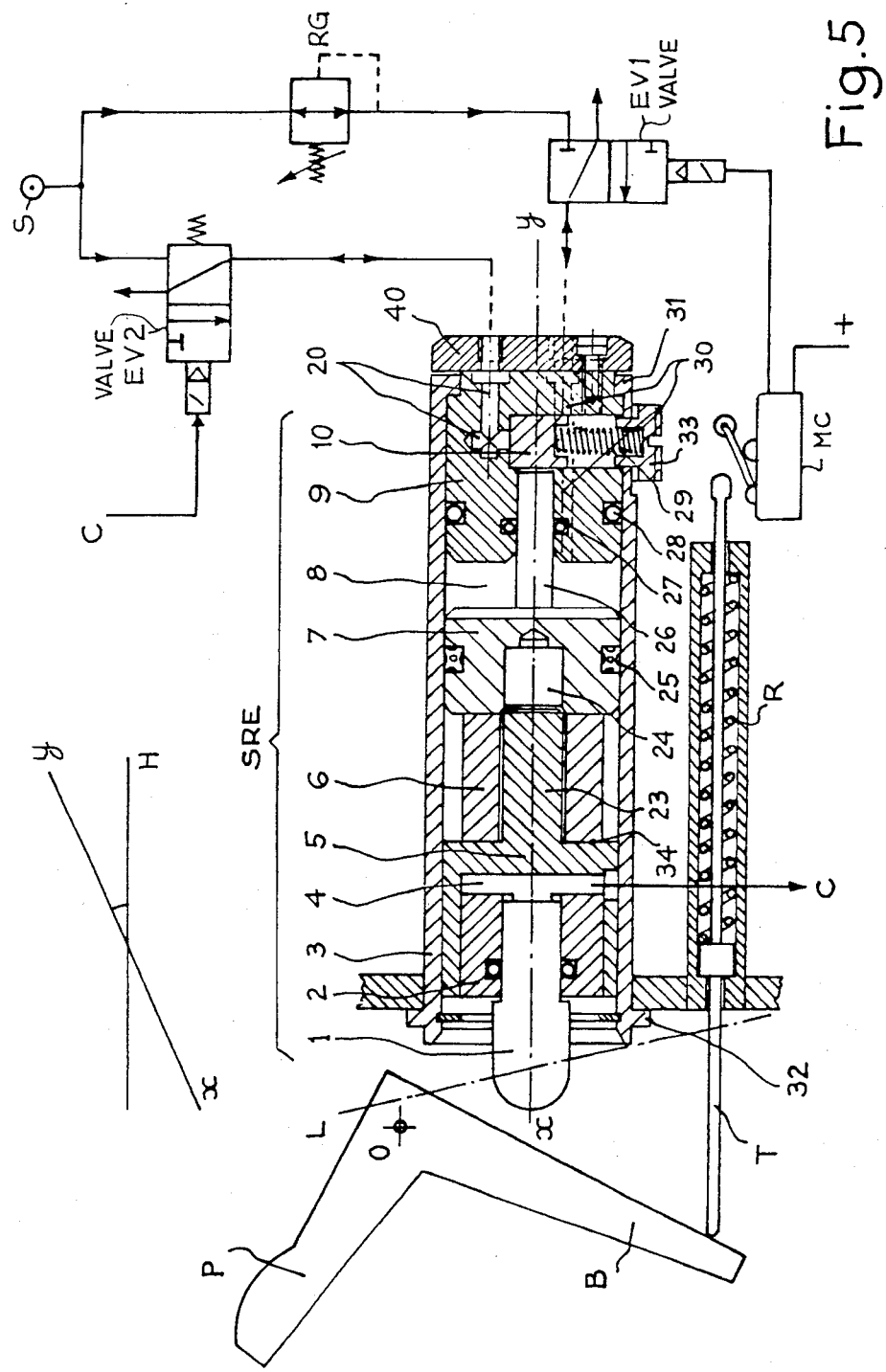

FORCE RESTORATION SYSTEM FOR THE SIMULATION OF VEHICLE DRIVING MEMBERS

BACKGROUND OF THE INVENTION

The force or power restoration system according to the invention relates to drive simulators and more particularly to the simulation of vehicle driving members.

For reasons of economy, efficiency and safety, the driving of vehicles and in particular armoured vehicles, is now taught by means of fixed drive simulators, instead of real vehicles.

In these simulators, the driving cabs are faithfully reproduced and are often mounted on moving platforms. By means of the latter, they are subject to movements determined by computers in accordance with the operations or manipulations performed, the state of the road, or that of the ground which it is assumed is being traversed.

The driving members and the like are simulated with respect to their arrangement in the cab, their appearance and also the forces necessary for their operation and the reaction which said members may transmit to the driver.

These driving members have reactions inherent therein, which are dependent on the type of vehicle, the operation taking place, the operating state of the driving member, and the manner in which the latter is actuated. A good knowledge of these reactions permits a better observation of the behaviour of the vehicle and consequently enables more effective action on the driving members. It is therefore vital that it is possible to simulate in a drive simulator, the mechanical reactions of the driving members and also certain of their failures.

The force restoration system according to the invention more specifically relates to the simulation of driving members acting via high pressure hydraulic controls. Thus, for example, it relates to the simulation of braking members and also, in the case of certain armoured vehicles, to the simulation of steering members, whose movements are transmitted by a hydraulic control and lead to braking forces on differential systems.

The use of a real braking system in a drive simulator is not satisfactory due to the unnecessary complexity thereof, its overall dimensions and its cost.

Hydraulic force restoration systems of the type shown in FIG. 1 have already been used in simulators. Their operating principle is similar to that of genuine braking systems. A master cylinder 2 transmits the braking force F, supplied by the driver, to a jack 6 via a pipe 3 and a hydraulic fluid from a tank 1. This fluid actuates the jack and brings about the compression of a stack of commercially available metallic, elastic washers 7, whose elasticity has been determined in such a way as to simulate the elastic expansion of real pipes and the deformation of the brake levers. An electrovalve 4 controlled by a computer C makes it possible, via a pipe 8 which returns the hydraulic fluid to the tank, to eliminate any reaction or "stiffness" opposing the operation of the pedal, as well as to simulate in this way a braking failure due to a hydraulic fluid leak. A pressure transducer 5 transmits the pressure value, which can reach 200 bar, to the computer.

Although apparently being relatively simple, the prior art system is not satisfactory. As a result of the pressure reached, the electrovalve, jack and pressure transducer constitute costly components. Moreover, the jack 6 and the stack of washers 7 form a space-consuming and unduly heavy assembly. Thus, in a driving simulator it may be necessary to use four force restoration systems of this type, namely two for the driving and two for the road and parking brakes. The weight and volume of the components fitted in the cab and, in the circumstances, those of the force restoration systems, obviously condition the performances and price of the moving platform mounted on hydraulic jacks, which moves this assembly. Another disadvantage of this type of force restoration system is that it may give rise to hydraulic fluid leaks in the driving cab.

SUMMARY OF THE INVENTION

The object of the force restoration system according to the invention is to simulate the feedback produced in certain hydraulic braking controls and, by a back-pressure, intended to bring about a constant braking force, and simultaneously a constant reaction of the pedal in a first step.

A further object of the system according to the invention is to simulate the deformation of the levers, the elasticity of the pipes exposed to the high pressure of the hydraulic fluid, and also the viscosity of the latter, by a given stiffness and damping of the brake pedal in a second step.

A further object of the system according to the invention is to simulate a braking failure, due to a hydraulic fluid leak.

A feature of the system according to the invention is to supply the back-pressure, stiffness, damping and braking failure by a combination of simple means, housed in a cylindrical envelope simulating the real master cylinder and in which inter alia, the stiffness and damping are obtained by an elastomer spring, the back-pressure by a piston exposed to compressed air and the braking failure due to the overriding or retraction of a mechanical stop by compressed air.

BRIEF DESCRIPTION OF THE DRAWINGS

Other features of the force restoration system according to the invention can be gathered from the following description of a non-limitative embodiment illustrated by the drawings, wherein show:

FIG. 5 the force restoration system according to the invention, associated with various ancillary members and forming therewith a braking simulator.

DESCRIPTION OF THE PREFERRED EMBODIMENT

Figure 1:
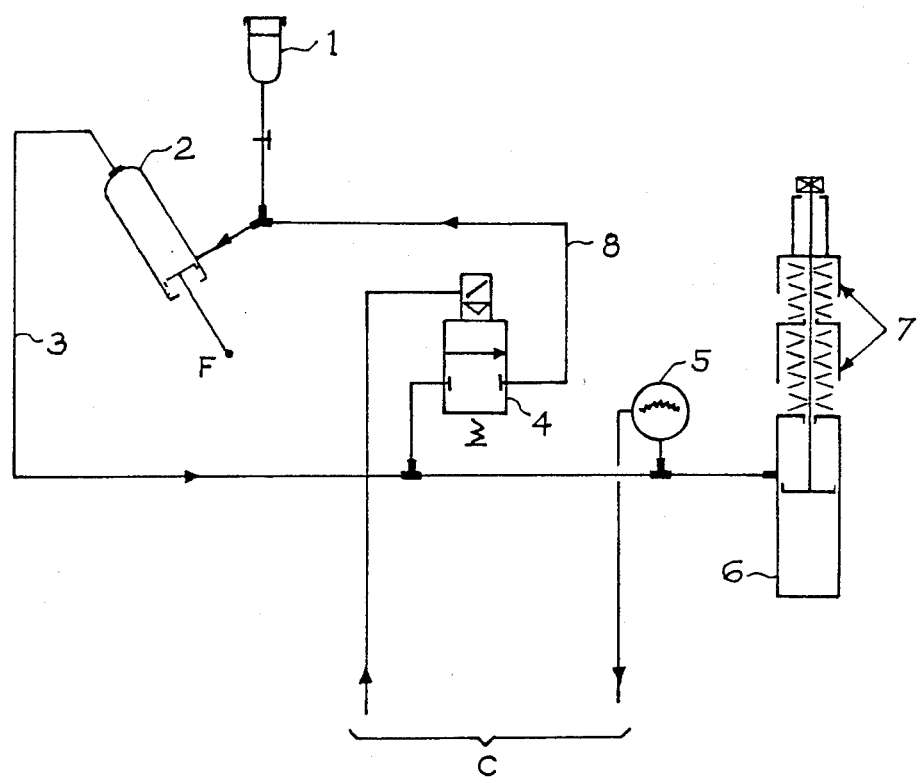
FIG. 1, referred to hereinbefore, a prior art braking simulation system.
Figure 2:
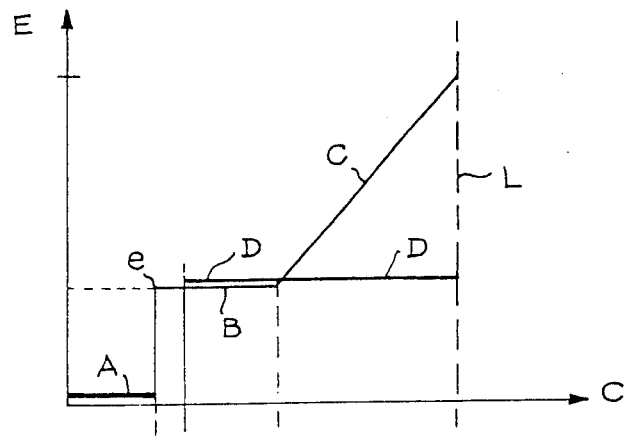
FIG. 2 the force E supplied by the driver to the pedal, as a function of the travel thereof in a driving simulator comprising a force restoration system according to the invention.

The theoretical profile of the force E produced by the driver in a force restoration system according to the invention (FIG. 2) is formed from straight segments characterizing the simulated braking system. It assumes slow movements of the pedal and does not take account, inter alia, of the effect of the viscosity of the hydraulic fluid but still restored by the system according to the invention.

At the start of the travel of the pedal, this profile has a segment A representing a substantially constant low force constituting a return to the rest position of the pedal. This is, for example, supplied by a spring having a great elongation and a limited rigidity associated with the pedal and which does not form part of the invention.

The force corresponding to the effective braking is represented by segments B and C. Segment B with a level or constant force, represents the effect of the feedback of the simulated controlled braking system. Segment C represents the deformation of the hydraulic pipes, as well as that of the levers maintaining the plates against the brake disks. The constant force segment C simulates a braking failure.

The decision to have a braking failure during the exercise is taken by the instructor, which controls the drive. In all cases, the travel of the pedal is limited by any mechanical stop, which is indicated by a limit L in the drawings.

The force restoration system according to the invention is indicated in longitudinal sectional form in FIG. 5 and is associated with various ancillary members, such as mechanisms, pneumatic or electrical circuits, and forms therewith a braking simulator.

A brake pedal P rotating about an axis O actuates by means of its arm B, the restoration system SRE, as well as a rod T, which controls a microcontactor MC. A six bar compressed air source S supplies system SRE by means of two electrovalves, electrovalve EV1 being controlled by microcontactor MC, whilst electrovalve EV2 is controlled by the computer. For information purposes, the axis xy of system SRE forms an acute angle with the horizontal plane H in the exergue diagram, which explains the unconventional appearance and upward direction of the pedal.

The force restoration system SRE according to the invention comprises an external cylindrical envelope 3, whose dimensions do not exceed that of a real master cylinder. This envelope may optionally be externally completed by certain dummy members, which serve to give the envelope an appearance closer to that of a master cylinder. The end of the envelope of the pedal side has an outer collar or flange 32 for fitting the system SRE, whilst the end which is opposite to the pedal has an inwardly directed support collar or flange 31, which withstands the forces developed in system SRE.

System SRE also has a first member 5 and a piston 7 sliding in envelope 3 and also a second member 9, introduced into the envelope and joined thereto at the end opposite to the pedal. The first member 5 is designed to receive a push rod 1, a pressure transducer 4 and an elastomer spring 6. It is lathe turned in one piece and comprises two coaxial parts of different diameters. The larger diameter part enables the member to slide in the envelope and has a coaxial recess. The other smaller diameter part constitutes a rod 23 in opposition to the recess. The two parts are joined, forming a shoulder and an annular transverse bearing surface 34.

The pressure transducer 4 is placed at the bottom of the recess and is held there by a ring 2, which has an axial bore, in which is placed the push rod 1. The first member has a transfer slot by which the pressure transducer is introduced. The wires from the transducer pass through a longitudinal slot in the envelope and transmit to the computer the value of force Fc.

A tubular, elastomer spring 6 is placed on rod 23. Its external diameter is determined in such a way that, once deformed by compression, it cannot come into contact with the envelope and its length is substantially equal to that of the rod. The characteristics of commercially available elastomer springs are known. These springs can easily be machined to obtain a given rigidity (length and diameter). They have small overall dimensions for an equal stored energy and in particular have smaller dimensions than a stack of elastic washers, whose rigidity can suffer from unrealistic irregularities. Moreover, washers suffer from considerable manufacturing tolerances and therefore the ribidity obtained as a result of such a stack is imprecise and approximately 20%. Moreover, elastomer springs give an impression of "viscosity," but with still a satisfactory return to zero for resetting.

The revolving piston axially and in opposition has a recess 24, whose diameter slightly exceeds that of the rod 23, as well as a cylindrical part or piston rod 26. It slides in the envelope and has a peripheral groove, in which is placed a joint 25 able to bring about a pneumatic seal with the envelope.

During operation, the second member 9 bears against flange 31 as a result of forces developed in system SRE. It is generally cylindrical and has one face disposed towards the outside of the envelope and through which issue, inter alia, a pipe 20 and a pipe 30. A cap 40, hermetically held against said face carries couplings for the compressed air pipes. The second face, towards the inside of the envelope, forms therewith and the piston a back-pressure chamber 8. This chamber is supplied by pipe 30, shown in dotted line form in the drawing, and which traverses member 9 from one face to the other. The second face has an axial bore, whose dimensions are such that piston rod 26 can slide therein. The axial bore issues into a blind radial bore, whose bottom is linked with pipe 20, by a supplementary hole coaxial to the radial bore and having a smaller diameter identical to that of pipe 20. A cylindrical stop member 10 slides in the radial bore and is held in place by a return spring 29. Spring 29 is compressed between the stop member and a plug 33, screwed into the radial bore and which traverses the envelope. This plug is perforated so as to permit an evacuation of air to the outside. Member 9 also has two circular grooves 27, 28, in which are placed joints ensuring the sealing of the back-pressure chamber.

Figure 3:
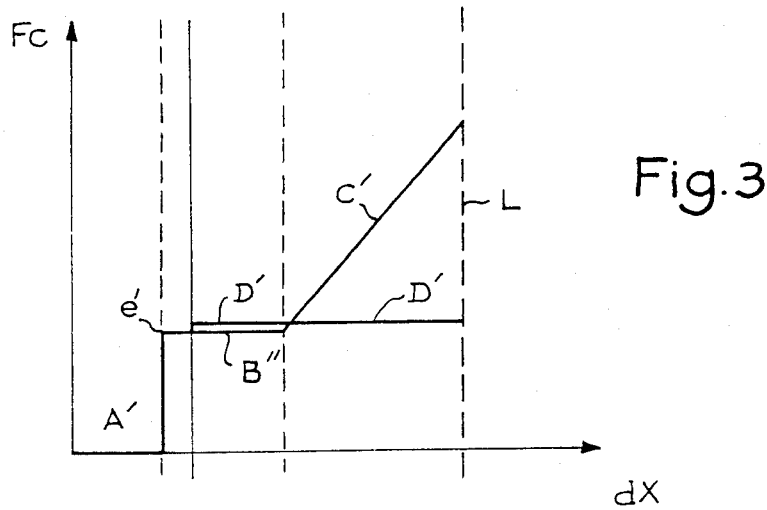
FIG. 3 the force Fc opposed by the restoration system according to the invention (step-up ratio 3).
Figure 4:
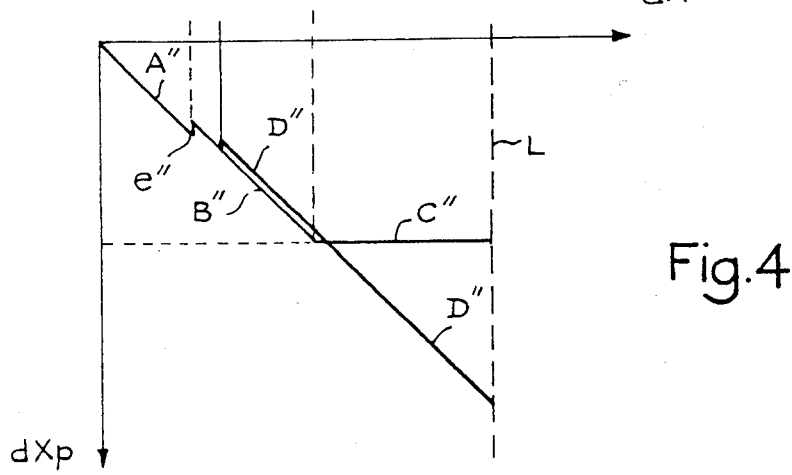
FIG. 4 the displacement dXp of the back-pressure piston.

The following description of the force restoration system according to the invention is illustrated by FIGS. 3 and 4. FIG. 3 represents the force Fc developed by system SRE, as a function of the displacement dX of the first member, measured from its rest position. FIG. 4 shows the displacement dXp of the piston from its rest position and as a function of the displacement dX. The two drawings are shown in correspondence with FIG. 2 and with the axis representing the travel of the pedal.

In the inoperative or rest state, the pedal is raised by rod T and spring R. The first member 5 is in its position closest to the pedal, i.e. in its rest position. The unstressed spring 6 is in contact with the bearing face of the first member and with piston 7. The two electrovalves are in the exhaust or escape position and the back-pressure chamber is not supplied. Stop member 10 is forced back by spring 29 to the bottom of the radial bore in the axis of the piston rod.

When the driver presses on the pedal, arm B starts to displace rod T, by compressing spring R. The arm then bears on the push rod 1, which simultaneously transmits the thrust to the pressure transducer 4, to the first member 5, to the spring 6 and to the piston 7. As the assembly of these members is subject to substantially no resistance, it moves within the envelope without there being any significant stressing of spring 6. This operation start is indicated by segments A, A' and A" of FIGS. 2, 3 and 4.

When rod T encounters and lowers the sensor of microcontactor MC, the latter controls the operation of electrovalve EV1 and consequently supplies compressed air to the back-pressure chamber 8. The back-pressure exerted against the piston is transmitted via spring 6 to the first member and to the pedal. It leads to a sudden rise in the representative curves at e and e'. Spring 6 contracts, which leads to a slight return of the piston, designated e' and e" in FIGS. 3 and 4. The continuation of the lowering of the pedal is indicated by levels B and B' and by an oblique segment B" in accordance with the equality of the displacement variations of the first member and the piston. After penetrating the second member 9, the piston rod encounters stop member 10 and is immobilized. This leads to the level C" in FIG. 4. This causes an increase in the compression of spring 6 between the first member and the piston, which is indicated by segments C and C' (FIGS. 2 and 3), whose slopes are proportional to the rigidity of the spring.

When the driver releases the pedal, the described phenomena occur in the opposite sense. In particular, the back-pressure forces the moving parts of system SRE towards their inoperative position.

The instructor can introduce a braking failure into the driving exercise by displaying it on his control console. The drive simulator computer then initiates the operation of electro-valve EV2. The compressed air introduced by pipe 20 forces stop member 10 against spring 29. As rod 26 is no longer stopped by the stop member, it enters the radial bore of the second member 9, whilst the piston only opposes spring 6 with the back-pressure force produced by the compressed air. This leads to the force levers D and D' in FIGS. 2 and 3, whilst the piston performs a greater displacement dXp than during normal braking (D", FIG. 4). This braking failure can only be carried out if the rod of piston 26 is not in engagement with the stop member. Thus, the computer only controls the operation of electrovalve EV2 if the value of the force supported by the transducer does not exceed that determined by level B'.

It can be demonstrated that the use of a force restoration system according to the invention in a vehicle driving system leads to significant weight and overall dimension gains. For example, in the case of an armoured vehicle, there is a weight reduction of 50 kg for the assembly of the force restoration systems and also 50 kg for the cab structure, i.e. approximately a total of 100 kg. There is also a space gain of more than 150 dm$^3$. This result is of particular interest, because it makes it possible to reduce the forces developed by the hydraulic jack supporting the cab, or to increase their angular acceleration.

What is claimed is:

1. A force restoration system for the simulation of vehicle driving members, which comprises:
   an envelope forming a cylinder open at one end and closed at the other;
   a first member sliding in said cylinder to receive the thrust exerted by the driver by the open end of the cylinder;
   a piston sliding in the cylinder between the first member and the closed end of the cylinder and defining with said closed end a back-pressure chamber;
   a tubular elastomer spring, whose ends respectively bear on the first member and the piston to transmit between them the pressures to which they are exposed;
   means for supplying the back-pressure chamber with compressed air, when the first member reaches a given position in the cylinder.

2. A system according to claim 1, which also comprises a push rod for transmitting the thrust of the driver to the first member, and a pressure transducer which makes it possible to measure said thrust.

3. A system according to claim 2, which also comprises a second member sealing the closed end of the cylinder and having a blind radial bore and an axial bore issuing into the radial bore, a retractable stop placed in the radial bore, a first rod extending the piston engaging in the axial bore and penetrating the radial bore or engaging with the retractable stop as a function of the position thereof, and means for retarding the retractable stop and restoring it to its position under the control of an external signal.

4. A system according to claim 2, wherein the means for operating the retractable stop comprise a first electrovalve, a first pipe issuing into the bottom of the radial bore and which is supplied by compressed air by the first electro-valve in order to move the stop towards the opening of said radial bore, a first return spring located in the radial bore for bringing the stop towards the bottom thereof and a plug screwed into said radial bore to maintain said return spring towards the opening of said axial bore.

5. A system according to claim 4, wherein the back-pressure chamber supply means comprise a second rod, which is operated simultaneously with the first member, a second return spring of limited rigidity to bring back the second rod in its initial position, a contactor operated by the second rod at the end of a predetermined travel thereof, a second electro-valve controlled by the contactor, and a second pipe which is connected to the back-pressure chamber and which is fed by compressed air by the second electro-valve.

* * * * *